US011958580B2

(12) United States Patent
Kocak et al.

(10) Patent No.: US 11,958,580 B2
(45) Date of Patent: Apr. 16, 2024

(54) UNMANNED UNDERWATER VEHICLE (UUV) BASED UNDERWATER COMMUNICATIONS NETWORK INCLUDING SHORT-RANGE NAVIGATION DEVICE AND RELATED METHODS (71) Applicant: Eagle Technology, LLC, Melbourne, FL (US)

(72) Inventors: Donna M. Kocak, Indian Harbour Beach, FL (US); Mario Miranda, Edgewater, FL (US); Fraser R. Dalgleish, Vero Beach, FL (US)

(73) Assignee: EAGLE TECHNOLOGY, LLC, Melbourne, FL (US)

( * ) Notice: Subject to any disclaimer, the term of this patent is extended or adjusted under 35 U.S.C. 154(b) by 683 days.

(21) Appl. No.: 17/096,246

(22) Filed: Nov. 12, 2020

(65) Prior Publication Data
US 2022/0144395 A1    May 12, 2022

(51) Int. Cl.
*H04B 10/00* (2013.01)
*B63B 21/50* (2006.01)
(Continued)

(52) U.S. Cl.
CPC .............. *B63G 8/001* (2013.01); *B63B 21/50* (2013.01); *B63B 22/003* (2013.01); *B63B 35/04* (2013.01);
(Continued)

(58) Field of Classification Search
CPC ...... H04B 10/80; H04B 10/116; H04B 10/40; H04B 10/2507; H04B 10/0795;
(Continued)

(56) References Cited

U.S. PATENT DOCUMENTS 4,686,927 A    8/1987 Hawkes et al.
5,551,363 A    9/1996 Cipolla et al.
(Continued)

FOREIGN PATENT DOCUMENTS

CN    104936194 B    8/2018
FR    2903541 A1    1/2008
(Continued)

OTHER PUBLICATIONS

Csnet International; Offshore Communications Backbone (OCB); retrieved on Dec. 14, 2020 from: http://csnetinternational.com/ocean-observing-systems-for-science-industry/; 5 pages.
(Continued)

*Primary Examiner* — Hanh Phan
(74) *Attorney, Agent, or Firm* — ALLEN, DYER, DOPPELT, + GILCHRIST, P.A. Attorneys at Law (57) ABSTRACT An underwater communications network may include spaced apart nodes on a bottom of a body of water. The underwater communications network may also include fiber optic cabling connecting the spaced apart nodes. Each node may include a frame, a node short-range navigation device carried by the frame, and an unmanned underwater vehicle (UUV) carried by the frame after delivering a fiber optic cable along a navigation path from an adjacent node. The UUV may be configured to cooperate with the node short-range navigation device during an end portion of the navigation path adjacent the frame.

25 Claims, 9 Drawing Sheets (51) Int. Cl.

| | |
|---|---|
| *B63B 22/00* | (2006.01) |
| *B63B 35/04* | (2006.01) |
| *B63B 49/00* | (2006.01) |
| *B63B 79/15* | (2020.01) |
| *B63B 79/40* | (2020.01) |
| *B63G 8/00* | (2006.01) |
| *G01S 1/04* | (2006.01) |
| *G01S 1/08* | (2006.01) |
| *G01S 1/70* | (2006.01) |
| *G01S 1/74* | (2006.01) |
| *G01S 1/76* | (2006.01) |
| *G05D 1/00* | (2006.01) |
| *H04B 10/25* | (2013.01) |

(52) U.S. Cl.
CPC .............. *B63B 49/00* (2013.01); *B63B 79/15* (2020.01); *B63B 79/40* (2020.01); *G01S 1/0426* (2019.08); *G01S 1/08* (2013.01); *G01S 1/7036* (2019.08); *G01S 1/752* (2019.08); *G01S 1/76* (2013.01); *G05D 1/0692* (2013.01); *H04B 10/25* (2013.01)

(58) Field of Classification Search
CPC .............. H04B 13/02; H04B 10/25753; H04B 10/07955; H04B 10/70953; B63G 8/001; G06F 1/1632
USPC ........ 398/104, 105, 172, 115, 116, 117, 135, 398/136, 158, 159, 33, 38, 25, 26, 27; 114/322, 337, 312, 244, 254, 242
See application file for complete search history.

(56) References Cited

U.S. PATENT DOCUMENTS

| | | | |
|---|---|---|---|
| 5,551,364 A | 9/1996 | Cipolla et al. | |
| 5,661,467 A | 8/1997 | Harada et al. | |
| 7,909,537 B2 | 3/2011 | Valdy | |
| 8,274,861 B1 | 9/2012 | Marn et al. | |
| 8,334,744 B1 | 12/2012 | Tibbetts | |
| 8,355,295 B1 | 1/2013 | Smallin | |
| 8,622,014 B2 | 1/2014 | Lundberg | |
| 8,770,129 B2 | 7/2014 | Hawkes et al. | |
| 8,831,393 B2 | 9/2014 | Jung | |
| 8,876,565 B2 | 11/2014 | Habisch et al. | |
| 8,953,944 B2 * | 2/2015 | Machado | H04B 13/02 398/115 |
| 9,176,248 B2 | 11/2015 | L'Her et al. | |
| 9,816,856 B2 | 11/2017 | Kocak et al. | |
| 9,944,370 B2 * | 4/2018 | Jamieson | B63G 8/001 |
| 9,992,038 B2 | 6/2018 | Youngbull et al. | |
| 10,001,616 B1 | 6/2018 | Abouraddy et al. | |
| 10,461,852 B1 | 10/2019 | Grubb et al. | |
| 2015/0376851 A1 * | 12/2015 | Yu | B63G 8/001 405/218 |
| 2018/0006506 A1 * | 1/2018 | Baer | H02J 50/12 |
| 2018/0033315 A1 | 2/2018 | Winkle | |
| 2018/0196152 A1 * | 7/2018 | Karabacak | G01V 1/3852 |
| 2019/0149417 A1 | 5/2019 | Augusto Lopes et al. | |
| 2019/0230500 A1 | 7/2019 | Goncalves | |
| 2019/0386823 A1 | 12/2019 | Viswanathan et al. | |
| 2020/0049849 A1 | 2/2020 | Hartland | |

FOREIGN PATENT DOCUMENTS

| | | |
|---|---|---|
| WO | 2016200386 A1 | 12/2016 |
| WO | 2019002419 A1 | 1/2019 |

OTHER PUBLICATIONS

Ocean Network Canada; North East Pacific Time-Series Undersea Networked Experiments (NEPTUNE) & Victoria Experimental Network Under the Sea (VENUS); retrieved on Dec. 14, 2020 from: https://www.oceannetworks.ca/observatories/; 7 pages.
DOI Regional Cabled Array; Regional Cabled Array (RCA); retrieved on Dec. 14, 2020 from: https://interactiveoceans.washington.edu/about/regional-cabled-array/; 3 pages.
Mbari; Monterey Accelerated Research System (MARS); retrieved on Dec. 14, 2020 from: https://www.mbari.org/at-sea/cabled-observatory/; 3 pages.
Aloha Cabled Observatory (ACO); Hawaii; retrieved on Dec. 14, 2020 from: http://aco-ssds.soest.hawaii.edu; 5 pages.
Jamstec; Dense Ocean floor Network system for Earthquakes and Tsunamis (DONET); retrieved on Dec. 14, 2020 from: https://www.jamstec.go.jp/donet/e/; 3 Pages.
Xu et al; Costal Seafloor Observatory at Xiaogushan in the East China Sea; Chinese Science Bulletin; Sep. 2011; vol. 56; No. 26; pp. 2839-2845; retrieved on Dec. 14, 2020 from: https://www.researchgate.net/publication/226699967_Coastal_seafloor_observatory_at_Xiaoqushan_in_the_East_China_Sea.
Integrated Ocean Observing System (IOOS); Alaska Ocean Observing System (AOOS), retrieved on Dec. 14, 2020 from: https://aoos.org/about-aoos/; 2 Pages.
Southern California Coastal Ocean Observing System (SCCOOS); retrieved on Dec. 14, 2020 from: https://sccoos.org/; 3 Pages.
Clivar; Indian Ocean Observing System (IndOOS); retrieved on Dec. 14, 2020 from: http://www.clivar.org/clivar-panels/Indian/IndOOS; 3 Pages.
Integrated Marine Observing System (IMOS); retrieved on Dec. 14, 2020 from: http://imos.org.au/; 3 Pages.
Integrated Ocean Observing System (IOOS); retrieved on Dec. 14, 2020 from: https://ioos.noaa.gov/; 7 Pages.
Smartatlantic; SmartBay; retrieved on Dec. 14, 2020 from: www.smartbay.ca; 2 Pages.
Platform of the Canary Islands (PLOCAN); retrieved on Dec. 14, 2020 from: https://www.plocan.eu/en/home/; 8 Pages.
Ocean Tracking Network (OTN); retrieved on Dec. 14, 2020 from: https://oceantrackingnetwork.org/; 2 Pages.
Lloret; Underwater Sensor Nodes and Networks; 2013, 13, pp. 11782-11796; doi:10.3390/s130911782; retrieved on Dec. 14, 2020 from: https://www.ncbi.nlm.nih.gov/pmc/articles/PMC3821334/.
Mbari; Autonomous Underwater Vehicle Docking; retrieved on Dec. 14, 2020 from: https://www.mbari.org/autonomous-underwater-vehicle-docking/; 5 Pages.
General Dynamics; Underse Distributed Network (UDN); retrieved on Dec. 14, 2020 from: https://gdmissionsystems.com/intelligence-systems/signals-intelligence/undersea-distributed-network; 3 Pages.
Kocak et al., U.S. Appl. No. 17/096,269, filed Nov. 12, 2020.

* cited by examiner

UNMANNED UNDERWATER VEHICLE (UUV) BASED UNDERWATER COMMUNICATIONS NETWORK INCLUDING SHORT-RANGE NAVIGATION DEVICE AND RELATED METHODS

TECHNICAL FIELD

The present invention relates to the field of networks, and more particularly, to underwater communications networks and related methods.

BACKGROUND

A communications network is a group of nodes interconnected by links that are used to exchange messages between the nodes. The links may use a variety of technologies based on the methodologies of circuit switching, message switching, or packet switching, to pass messages and signals.

One type of network is a seafloor network. A seafloor network is typically used by industry, government and academia to observe and record measurements in the environment and transmit data over long distances. Traditional deployments of seafloor networks may be relatively expensive and typically involve manual connections on the surface and lowering the cable and equipment to the seafloor.

Relatively large cable ships are typically used along with a corresponding crew for cable installation operations. Both the ships and crew may be exposed to relatively harsh environmental conditions during deployments and installation operations.

PCT Application Publication No. WO 2016/200386 discloses a self-deploying and self-healing subsea network that includes one or more homing vehicles, one or more data repeaters, and one or more independent guidable homing systems configured to assist the homing vehicles in localization of and docking with the data repeaters. Data repeaters are deployed in a body of water and, at a predetermined time, a homing vehicle is released from a first data repeater and instructed to transit to and dock with a predetermined second data repeater. After docking, a network cable is operatively placed into communication between the first data repeater and the second data repeater.

U.S. Pat. No. 8,831,393 to Jung is directed to an unmanned underwater vehicle and device for connection of an optical waveguide cable to an unmanned underwater vehicle. More particularly, Jung discloses unmanned underwater vehicles that can be controlled from a carrier platform by an optical waveguide cable. The optical waveguide cable is to be connected to the underwater vehicle via a connecting device. The connecting device includes a connecting cable and connecting elements at the ends of the connecting cable for an optical waveguide cable at one end and for an unmanned underwater vehicle at the other end.

SUMMARY

An underwater communications network may include a plurality of spaced apart nodes on a bottom of a body of water. The underwater communications network may also include fiber optic cabling connecting the plurality of spaced apart nodes. Each node may include a frame, a node short-range navigation device carried by the frame, and an unmanned underwater vehicle (UUV) carried by the frame after delivering a fiber optic cable along a navigation path from an adjacent node. The UUV may be configured to cooperate with the node short-range navigation device during an end portion of the navigation path adjacent the frame.

The node short-range navigation device may include at least one of a short-range acoustic navigation device, short-range optical navigation device, and a short-range radio-frequency (RF) navigation beacon, for example. The UUV may include a UUV short-range navigation device cooperating with the node short-range navigation device. The UUV may include a node long-range navigation device for the UUV as the UUV travels along the navigation path.

At least one node of the plurality of spaced apart nodes may include a deployable electronic buoy carried by the frame, for example. The deployable electronic buoy may include a deployable electronic sensor buoy, for example.

The deployable electronic sensor buoy may include one of a vibration sensor, a temperature sensor, and a pressure sensor. The deployable electronic buoy may include a deployable electronic wireless communications buoy.

The fiber optic cabling may include at least one sensing optical fiber, for example. Each node may include communications circuitry coupled to the fiber optic cabling. Each node may include a power source coupled to the communications circuitry, for example. The frame may include a docking station for receiving the UUV therein.

A method aspect is directed to a method of forming an underwater communications network. The method may include deploying a plurality of spaced apart nodes on a bottom of a body of water. The method may include connecting the plurality of spaced apart nodes with fiber optic cabling. Each node may include a frame, a node short-range navigation device carried by the frame, and an unmanned underwater vehicle (UUV) carried by the frame after delivering a fiber optic cable along a navigation path of travel from an adjacent node. The UUV may be configured to cooperate with the node short-range navigation device during an end portion of the navigation path adjacent the frame.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Figure 1:
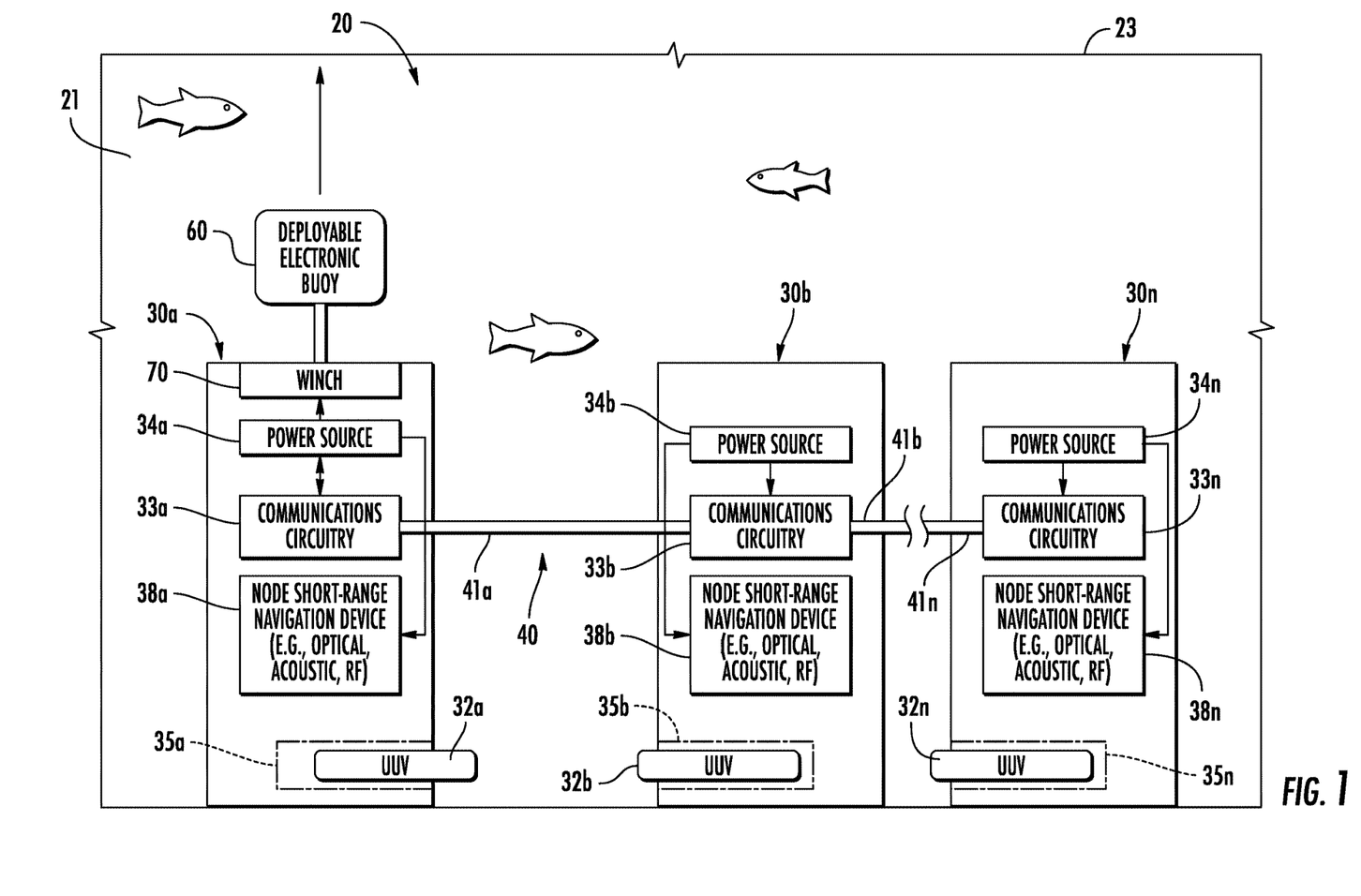
FIG. 1 is a schematic diagram of an underwater communications network in accordance with an embodiment.
Figure 2:
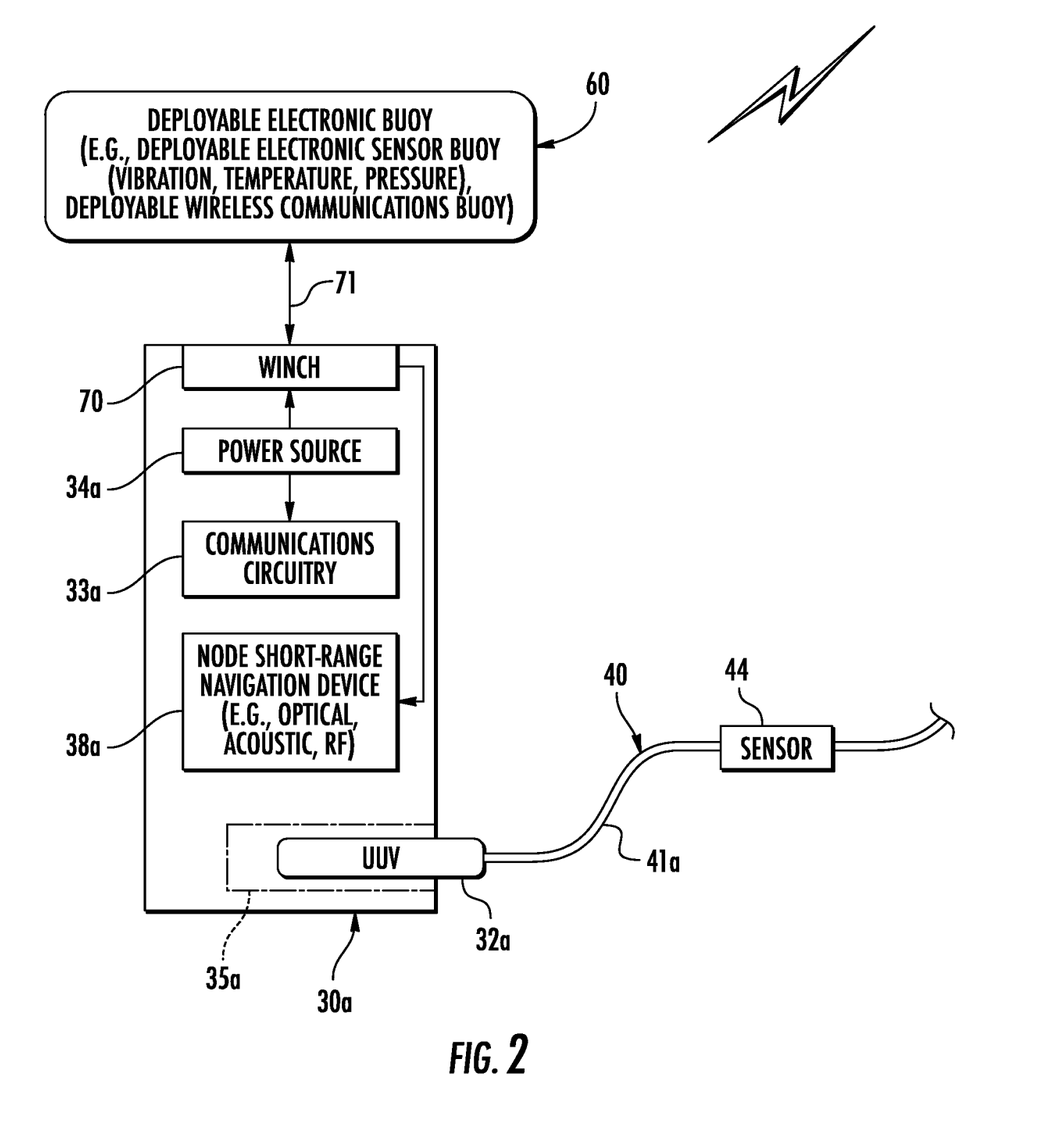
FIG. 2 is a schematic diagram of a node of FIG. 1.
Figure 3:
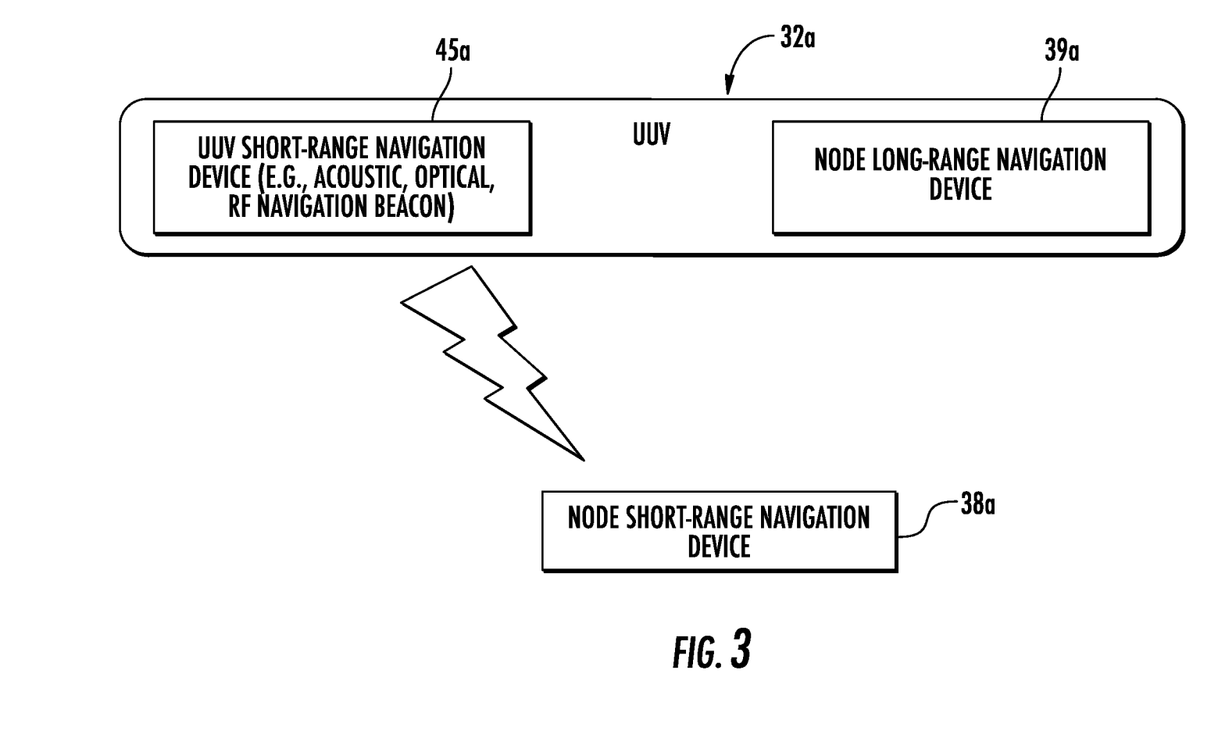
FIG. 3 is a more detailed schematic diagram of a UUV of a node of FIG. 1.

Referring initially to FIGS. 1-3, an underwater communications network 20 includes spaced apart nodes 30a-30n on a bottom 22 of body of water 21, for example, a seafloor. While three nodes 30a-30n are illustrated, those skilled in the art will appreciate that there may be any number of nodes. The nodes may be deployed from the air, the surface or subsea, with manned or unmanned platforms, for example.

The underwater communications network 20 also includes fiber optic cabling 40 that connects the spaced apart nodes 30a-30n. The fiber optic cabling 40 may include one or more sensing optical fibers 41a-41n. For example, the fiber optic cabling 40 may include a sensor 44 or define a sensor so that it has sensing properties such that vibration, temperature, and pressure may be sensed. Moreover, a squeezing of the optical cabling 40 may change the properties of the cabling, which may be used to identify hazards or used as a basis for changing the topology of the underwater communications network 20 (e.g., by way of node locations).

Each node 30a-30n includes a frame 31a-31n and an unmanned underwater vehicle (UUV) 32a-32n carried by the frame after delivering a fiber optic cable 40 (e.g., which may be used for sensing) of the fiber optic cabling 40 along a navigation path from an adjacent node. The frame 31a-31n may include one or more docking stations 35a-35n for receiving the UUV 32a-32n therein. For example, the docking station 35a-35n may be in the form of a garage defined by the frame 31a-31n. The docking station 35a-35n may be in another form or location relative to the frame 31a-31n, for example, alongside the frame. Each UUV 32a-32n may be self-deployed or autonomous between adjacent nodes 30a-30n, for example, based upon coordinates of the nodes.

Each node 30a-30n also includes a node short-range navigation device 38a-38n carried by the frame 31a-31n. The node short-range navigation device 38a-38n may be any one or more of a short-range acoustic navigation device (e.g., acoustic pinger), short-range optical navigation device (e.g., optical reflector), and a short-range radio-frequency (RF) navigation beacon, for example. Of course the node short-range navigation device 38a-38n may include other and/or additional types of short-range navigation devices using different navigation techniques. Each UUV 32a-32n cooperates with the corresponding node short-range navigation device 38a-38n during an end portion of the navigation path adjacent the frame 31a-31n, for example, using a UUV short range navigation device 45a-45n. In other words, cooperation of the UUV and the node short-range navigation devices 38a-38n, 45a-45n guides each UUV 32a-32n into the docking station 35a-35n when it is in range.

Each node 30a-30n, and more particularly, each UUV 32a-32n may also include a node long-range navigation device 39a. The node long-range navigation device 39a is for the UUV and operates as the UUV travels along the navigation path, for example, from the adjacent node. Those skilled in the art will appreciate that the node long-range navigation device 39a may guide the UUV 32a-32n along the navigation path, for example, using global positioning or other longer range navigation techniques, and up to an in-range position with the node short-range navigation device 38a-38n. In an embodiment, the node long-range navigation device 39a may be used in conjunction with the node short-range navigation device 38a-38n during the end portion of the navigation path.

Each node 30a-30n may also include communications circuitry 33a-33n coupled to the fiber optic cabling 40, and more particularly, to respective ones of the fiber optic cables 40. The fiber optic cable 40 permits communication between adjacent nodes 30a-30n, and may perform sensing operations, as described above.

The communications circuitry 33a-33n of each node 30a-30n is powered by a power source 34a-34n. The power source 34a-34n may be a pre-equipped on-board power source, such as, for example, a battery, an external add-on source through an auxiliary connector, an inside (e.g., via a docking station 35a-35n) hardwired connection, and/or an inside (e.g., via the docking station) wireless connection for example. Of course, the power source 34a-34n may be another type of power source. The power source 34a-34n may also power either or both of the node short-range and long-range navigation devices 38a-38n, 39a.

At least one node 30a from among the spaced apart nodes 30a-30n includes a deployable electronic buoy 60 that is carried by the frame 31a. The deployable electronic buoy 60 may be a deployable electronic sensor buoy, for example, and include one or more of a vibration sensor, a temperature sensor, and a pressure sensor. The deployable electronic buoy 60 may also be a deployable electronic wireless communications buoy, and include one or more wireless receivers and/or transmitters. More than one node 30a-30n may include a deployable electronic buoy 60.

In some embodiments, the node or nodes 30a-30n including the deployable electronic buoy 60 may include a winch 70 carried by the frame 31a-31n for controllably deploying the deployable electronic buoy to the surface 23 of the body of water 21. By being at the top or surface 23 of the body of water 21, the deployable electronic buoy 60 may wirelessly communicate based upon line-of-sight or with communications satellites, which may be prohibitive on the bottom 22 of the body of water or seafloor. The deployable electronic buoy 60, when communicating above the surface 23 of the body of water 21, may acquire instructions and/or position information that may be used for deployment of the underwater communications network 20 or UUVs 32a-32n, for example.

Figure 4A:
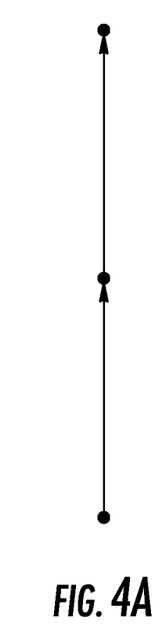
FIG. 4A is a schematic diagram of an exemplary node configuration of an underwater communications network in accordance with an embodiment.
Figure 4B:
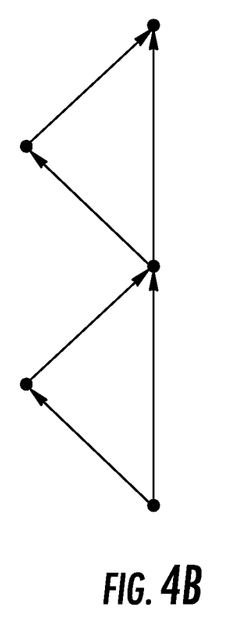
FIG. 4B is a schematic diagram of an exemplary node configuration of an underwater communications network in accordance with an embodiment.
Figure 4C:
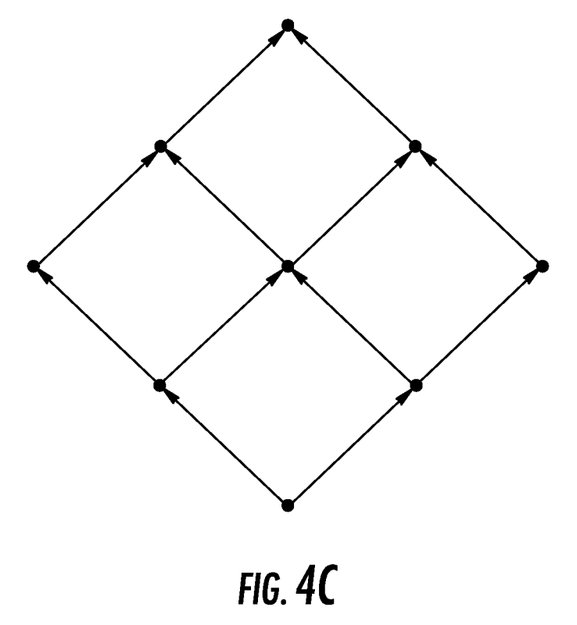
FIG. 4C is a schematic diagram of an exemplary node configuration of an underwater communications network in accordance with an embodiment.

As will be appreciated by those skilled in the art, the spaced apart nodes 30a-30n may be considered lander nodes, and the fiber optic cabling 40 may be small, ultra-strong, highly-integrated (SUSHI) fiber optic cable links that are carried by the UUVs 32a-32n. The UUVs 32a-32n may be self-deploying or autonomous, for example. The links and nodes can be arranged to form various network configurations. Referring briefly to FIGS. 4A-4C, three exemplary network configurations of nodes, denoted by circles, and links, denoted by arrowed lines, are illustrated—point-to-point (FIG. 4A), redundant (FIG. 4B), and mesh (FIG. 4C)—the nodes of which may correspond to the spaced apart nodes 30a-30n and the links of which may correspond to the delivered fiber optic cables 40.

A single UUV 32a-32n is typically used to assemble each link, which may be performed by traversing from its home lander or node 30a to an adjacent destination node 30b or lander and paying out the fiber optic cable 40 along its path. Fiber optic cable terminations may be hardwired at the source or home node 30a. When the UUV 32a-32n docks in its destination node, an optical network connection is made wirelessly or through a magnetic connection, as will be described in further detail below. A relatively simple network configuration includes a single UUV $32a$-$32n$ and a single (empty) docking station $35a$-$35n$, which can form a point-to-point configuration as illustrated in FIG. 4A. Each node $30a$-$30n$ may be modularly expanded to include more than one UUV $32a$-$32n$ and associated docking stations $35a$-$35n$ as desired, for example, to establish redundant paths and point-to-multi-point (P2MP) connections as illustrated in FIGS. 4B and 4C. The quantity of network ports, and hence size of the node $30a$-$30n$, is thus scalable.

Further technical details of exemplary nodes $30a$-$30n$ will now be described. With respect to each node $30a$-$30n$, and more particularly, the frame $31a$-$31n$ of each node, the node may be conceptually similar to those used on the Triton 36000/2 Hadal Exploration System available from Triton Submarines, LLC of Sebastian, Florida.

The winch 70 of each node $30a$-$30n$ may be a subsea winch, for example, a MERMAC™ electrically driven winch available from MacMartney Underwater Technology of Denmark. The winch 70 advantageously controls the deployment of communications equipment and sensors by raising and lowering the deployable electronic buoy 60, for example, at pre-defined or commanded intervals, speeds, and depths by way of a cable 71. The winch 70 may operate in relatively harsh underwater environments. To accommodate the relative harsh underwater environments, the motor and control electronics, as well as the slip ring of the winch 70 may all be encapsulated, and may be manufactured from structural steel so to accommodate a depth of 500 m and 3,200 m cable capacities. In some embodiments, the winch 70 may include steel-armored and PUR jacket cables.

As described above, each winch 70 controls a respective deployable electronic buoy 60, which may be embodied as a communications and/or sensor float (FIG. 2). When the deployable electronic buoy 60 is in the form of a deployable electronic wireless communications buoy, communications can be above and below the surface 23 of the body of water 21, for example, by using a hybrid software defined radio (modem) with optical, acoustic and/or RF transceiver capability. When the deployable electronic buoy 60 is in the form of a deployable electronic sensor buoy, one or more sensors may collect information from the environment above and below the surface 23 of the body of water 21. An exemplary sensor may include a relatively small hydrophone, which can alert to unexpected activity on the surface 23 or unsafe sea conditions. In some embodiments, the deployable electronic buoy 60 may rise to the surface 23 of the body of water 21 when no activity or threat of damage is detected. Once at the surface 23 of the body of water 21, the deployable electronic buoy 60 may communicate based upon line of sight (LOS), beyond line of sight (BLOS) and satellite communications (SATCOM), for example, by using several different waveforms based upon the type of application (e.g. high-bandwidth exfiltration, command and control infiltration, LPI/LPD text messages, etc.).

Figure 5:
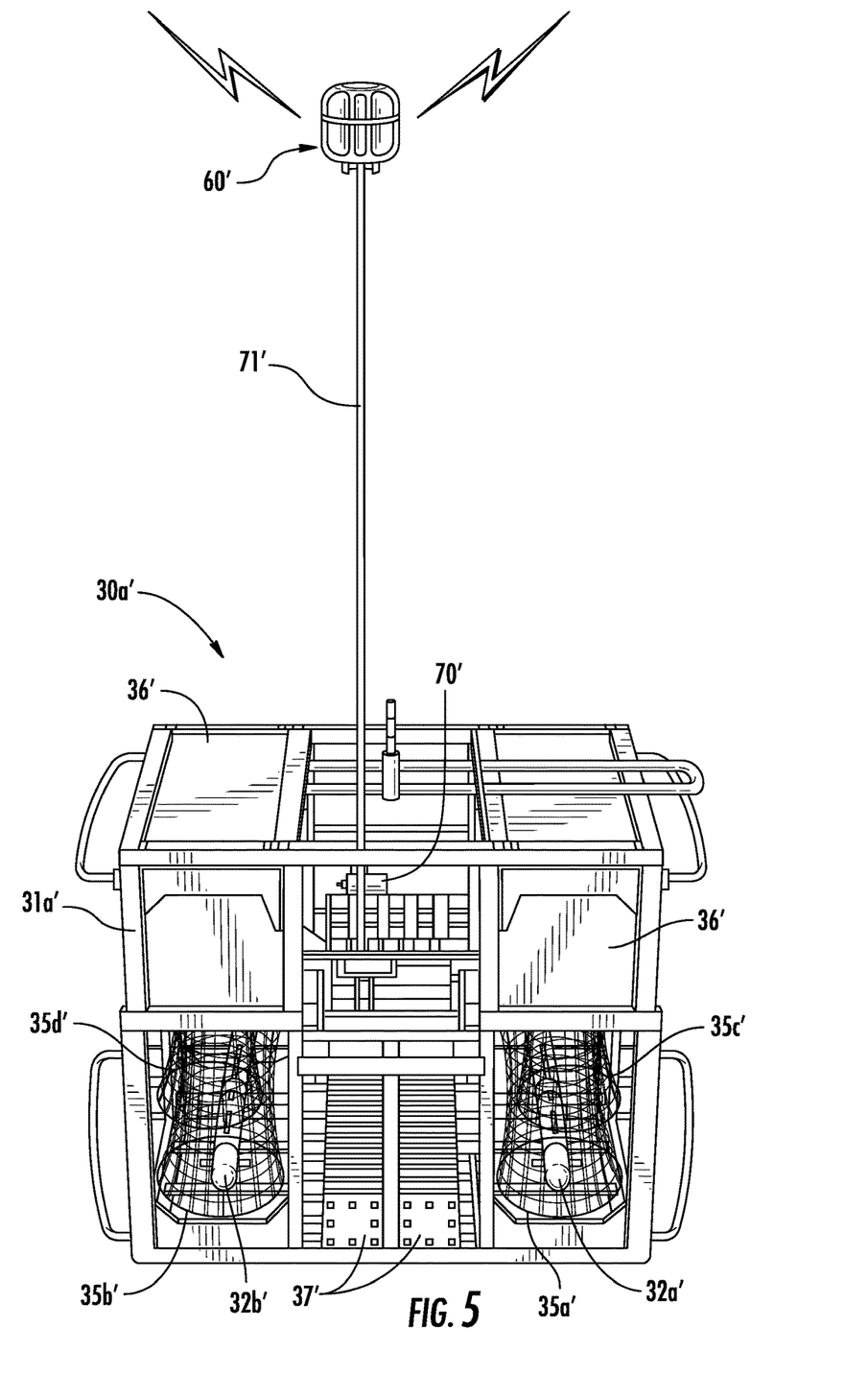
FIG. 5 is a schematic diagram of an exemplary node in accordance with an embodiment.
Figure 6:
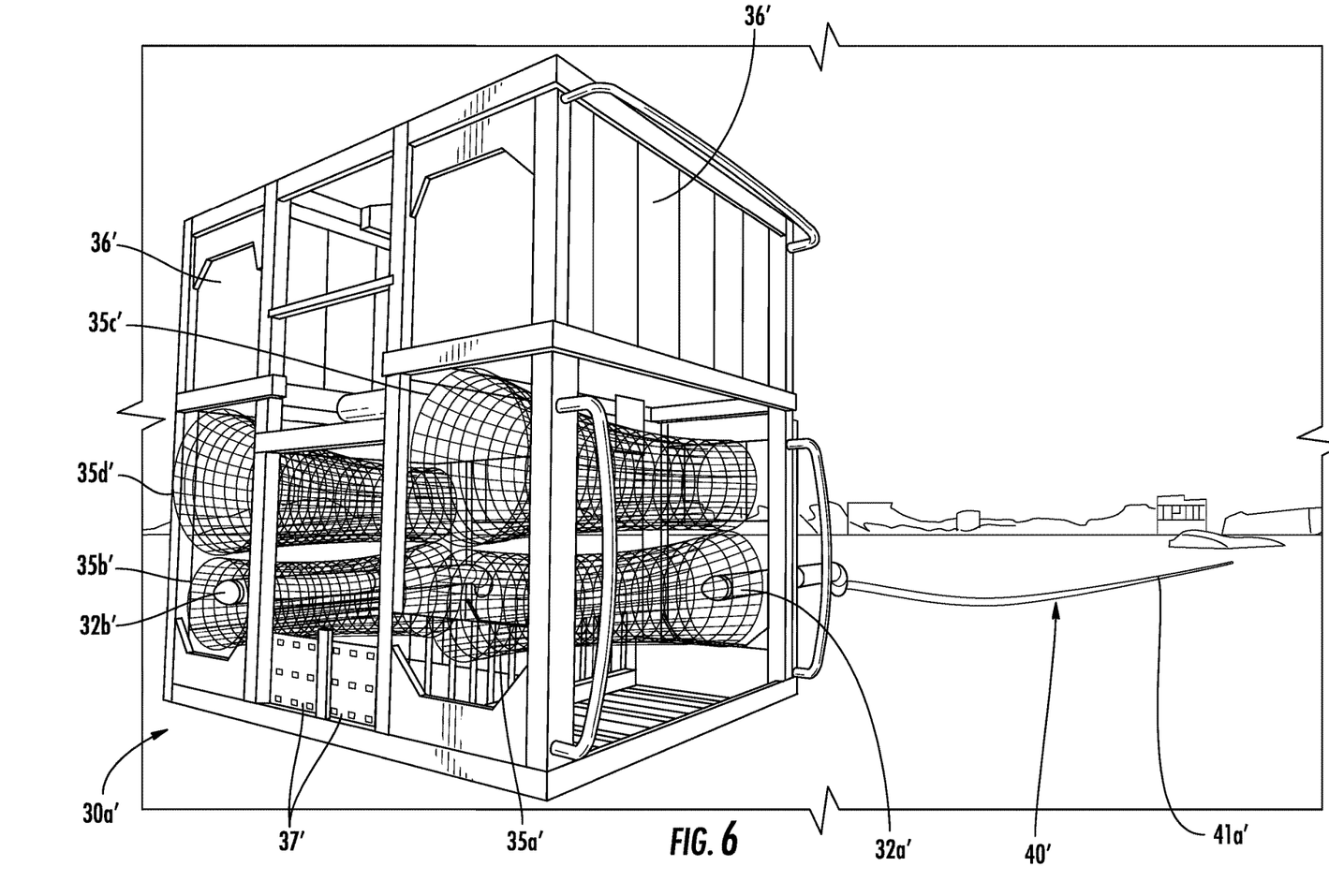
FIG. 6 is another schematic diagram of the exemplary node of FIG. 5.

Referring now briefly to FIGS. 5-6, an exemplary node $30a'$ illustratively includes four docking stations $35a'$-$35d'$ for corresponding UUVs $32a'$, $32b'$. The docking stations $35a'$-$35d'$ permit the UUVs $32a'$, $32b'$ to enter in one direction, into a larger "fly-catcher" side. Many techniques have been used to guide a UUV into a docking station. For example, the IVER4 UUV available from L3Harris Corporation of Melbourne, Fla. has been used to successfully dock inside of 21-inch tubes or docking stations. In some embodiments, a node $30a'$ may include at least one empty docking station $35c'$, $35d'$ and at least one docking station $35a'$, $35b'$ that is equipped with a UUV. An empty docking station $35c'$, $35d'$ may provide a power and optical data path into the node $30a'$ to tie the associated link into the larger network, for example, by way of the communication circuitry $33a'$-$33n'$, described above.

Foam, for example, syntactic foam 36' may be placed in a top portion of each node $30a'$, and relatively heavy items and desired drop weights 37' may be placed at a bottom of each node. This may advantageously permit the nodes $30a'$ to be "dropped" from the surface or another elevation above the seafloor. The nodes $30a'$ remain upright during free fall without any fins or other devices to keep them vertical.

Referring again to FIGS. 1-3, with respect to network connections, the fiber optic cabling 40 or fiber optic network connections are terminated inside each node $30a$-$30n$. Optical links may couple the UUVs $32a$-$32n$ to the fixed connections via wireless protocol, for example, or a magnetic coupling arrangement as described in U.S. Pat. No. 9,816,856, assigned to the present assignee, and the entire contents of which are hereby incorporated by reference. Relatively small form factor protocols (SFPs) convert the fiber optic data to electrical signals inside the network media converters and connect to the network traffic via the router switches.

With respect to power sources $34a$-$34n$, each power source, may use aluminum-water (Al—H2O) technology. This technology may provide a relatively safe, cost competitive, and energy dense approach for static and dynamic components. The Al—H2O technology uses aluminum as a fuel to generate electricity and produces an inert byproduct. Power modules or sources may be customized to meet desired specifications. Additional ports on the nodes $30a$-$30n$ accommodate external battery packs, for example.

With respect to sensors, sensors may be integrated into the nodes $30a$-$30n$ and/or the deployable electronic buoy 60, as described above. Sensors may include passive hydrophones or distributed fiber optic sensors to detect acoustic and seismic signatures generated by undersea and surface vehicles or environmental effects. Of course, other and/or additional sensors may be used. The sensors may cooperate with the communications circuitry $33a$-$33n$ and/or other processing circuitry carried by the frame $31a$-$31n$ of each node $30a$-$30n$.

With respect to fiber optic cabling 40, the network links may include the UUV $32a$-$32n$, particularly a modified IVER UUV available from L3Harris Corporation of Melbourne, Florida, and a SUSHI fiber optic cable payload, also available from L3Harris Corporation. The use of a SUSHI fiber optic payload may offer innovative features, such as, for example, low-loss silica, a standard acrylate buffer, an added buffer, a relatively high packing density, relatively high-tenacity aramid fibers, a robust jacket wall, and/or nanoparticle density modifiers. In summary, SUSHI can be customized for its desired usage based on the environment. For example, the diameter can be reduced to allow for longer link lengths; strength members can be added to increase the break strength to better withstand abrasions encountered on the seafloor; and the buoyancy can be controlled to reduce drag on the UUV during deployment.

It may be desirable to have a free-flooded payload section of the UUV $32a$-$32n$ equipped with precision wound cable packs. This may lend itself to a relatively easy deployment and payout. Nodes $30a$-$30n$ may be scaled to achieve desired cable length links.

Accordingly, the underwater communications network 20 may be particularly advantageous for its ability to be scalable and configurable in multiple pre-defined and software re-configurable topologies. For example, the underwater communications network 20 may be particularly useful for establishing a communications network between oil rigs, and does not involve dropping of cable from the back of boats. Additionally, the underwater communications network 20 connects autonomously using self-deployed and self-docking UUVs 32a-32n to payout and terminate node-to-node cable links on the seafloor. Moreover, as will be appreciated by those skilled in the art, to decommission the underwater communications network 20 or any node or nodes 30a-30n therein, their respective links may be disconnected (physically and/or electronically) between the UUV 32a-32n and the respective nodes (autonomously or commanded). If decommissioning is desired, the UUVs 32a-32n and the nodes 30a-30n may be disposed by electronic scuttle and cathodic corrosion.

A method aspect is directed to a method of forming an underwater communications network 20. The method includes deploying a plurality of spaced apart nodes 30a-30n on a bottom 22 of a body of water 21. The method includes connecting the plurality of spaced apart nodes 30a-30n with fiber optic cabling 40. Each node 30a-30n includes a frame 31a-31n, and an unmanned underwater vehicle (UUV) 32a-32n carried by the frame after delivering a fiber optic cable 40 thereto, and at least one node 31a of the plurality of spaced apart nodes including a deployable electronic buoy 60 carried by the frame.

While several embodiments have been described herein, it should be appreciated by those skilled in the art that any element or elements from one or more embodiments may be used with any other element or elements from any other embodiment or embodiments. In other words, different embodiments or variations of nodes and UUVs may be used within the underwater communications network 20. For example, a node with a single docking station (FIGS. 1 and 2) may be used with a node with four docking stations (FIGS. 5-6).

Figure 7:
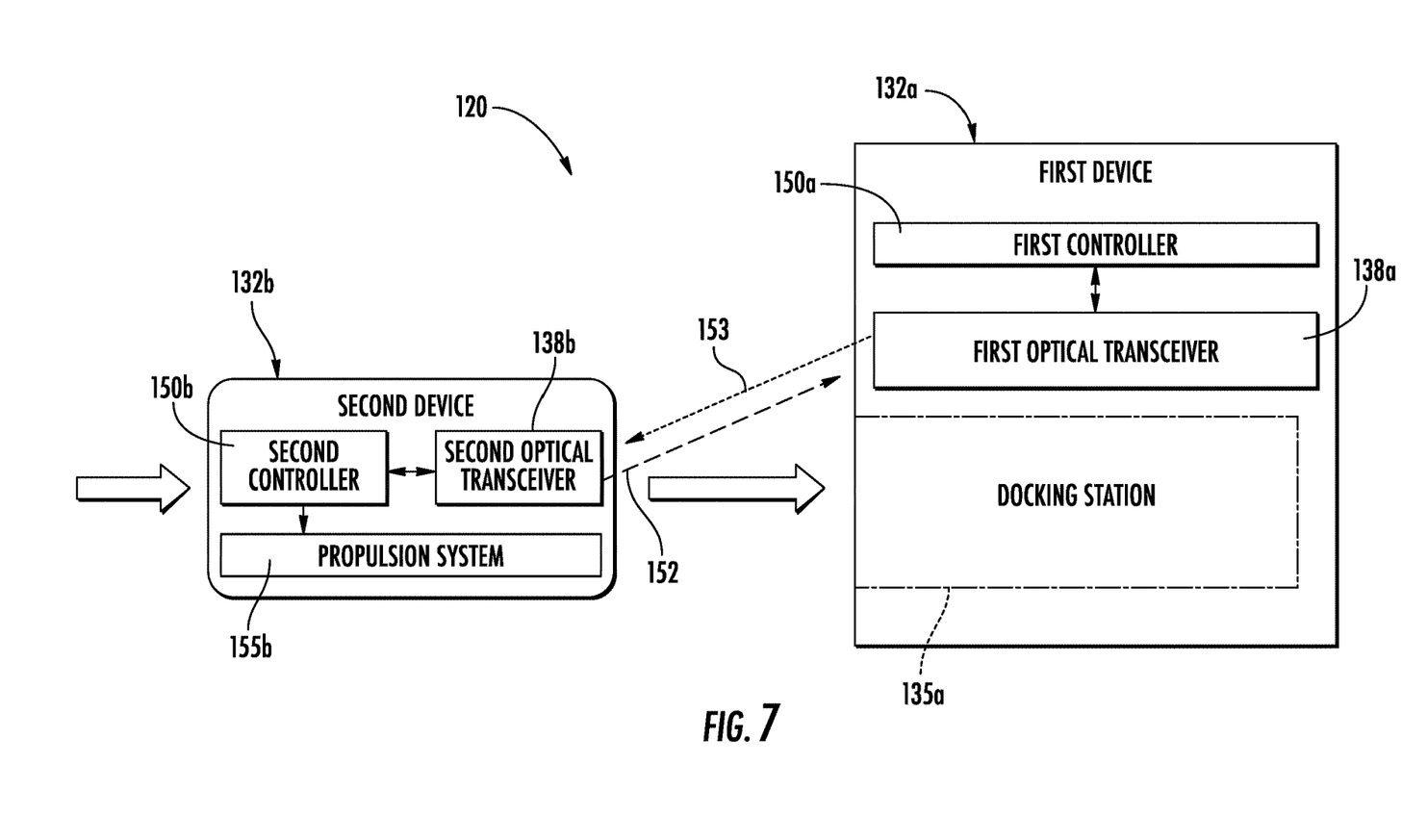
FIG. 7 is a schematic diagram of a docking system in accordance with an embodiment.
Figure 8:
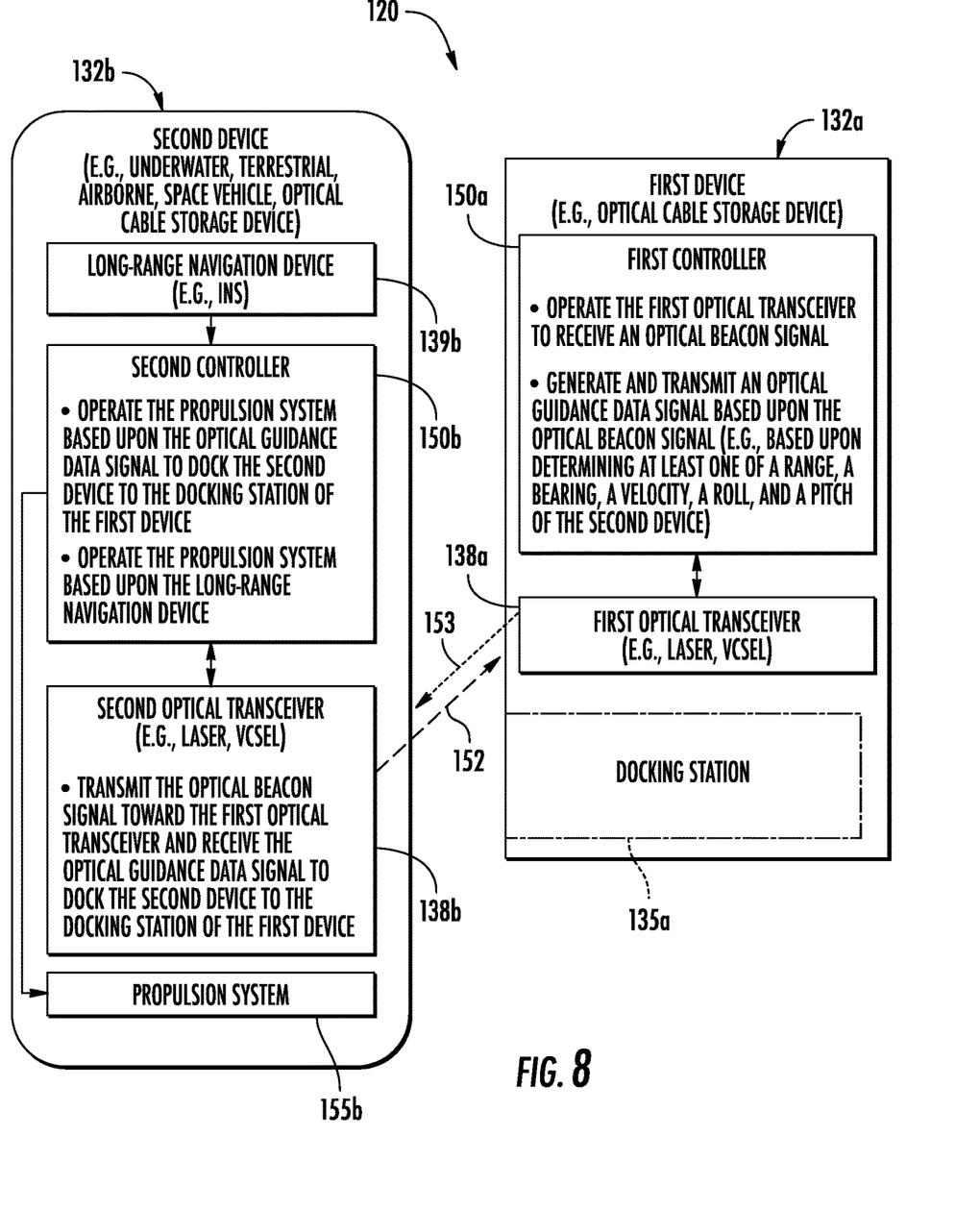
FIG. 8 is a schematic block diagram of the docking system of FIG. 7.

Referring now to FIGS. 7 and 8, in another embodiment, a docking system 120, for example, may be usable with the underwater communications network 20 described above. The docking system 120 illustratively includes a first device 132a and a second device 132b. The second device 132b is movable relative to the first device 132a. The first device 132a may be in the form of or include an optical cable storage device, for example.

The second device 132b may be in the form of an underwater vehicle, for example, an unmanned underwater vehicle. The second device 132b may alternatively be in the form of a space vehicle. The second device 132b may be in the form of a terrestrial vehicle. The second device 132b may also be in the form of an airborne vehicle. The second device 132b may be in the form of or include an optical cable storage device.

The first device 132a includes a docking station 135a, for example, for receipt of the second device 132b therein or thereat, depending on the form of the second device. The first device 132a also includes a first optical transceiver 138a. The first optical transceiver 138a may be a first laser transceiver for example, a first vertical cavity surface emitting laser (VCSEL). The first optical transceiver 138a may operate in the blue or blue-green color spectrum. In some embodiments, for example, terrestrial and/or aerial, the first optical transceiver 138a may operate in a range of wavelengths, for example, just outside of the visible spectrum (e.g., 900-2000 nm). This may increase the difficulty in detection, which may be desirable in certain operations or applications, as will be understood by those skilled in the art.

The first device 132a may also include a first controller 150a that operates the first optical transceiver 138a to receive an optical beacon signal 152 and generate and transmit an optical guidance data signal 153 based on the optical beacon signal. The optical guidance data signal 153 may be for directing, controlling, or for steering the second device 132b, as will be described in further detail below. The first controller 150a may determine a one or more of a range, a bearing, a velocity, a roll, and a pitch of the second device 132b. The first controller 150a may thus generate the optical guidance data signal 153 based upon any one of the range, the bearing, the velocity, the roll, and the pitch of the second device 132b, as will be appreciated by those skilled in the art.

The second device 132b illustratively includes a propulsion system 155b. The propulsion system 155b may include different hardware or configurations depending on the application or type of device or vehicle that is the second device 132b. For example, when the second device 132b is in the form of an underwater vehicle, the propulsion system 155b may include a propeller or impeller, rudder, and power plant (e.g., driveshaft, and battery or engine). When the second device 132b is in the form of a space vehicle, the propulsion system 155b may include rockets, rocket boosters, and/or other spaced-based propulsion components, as will be appreciated by those skilled in the art. When the second device 132b is in the form of a terrestrial vehicle, the propulsion system 155b may include an engine or battery, driveshaft, and wheels or tracks, for example. For an airborne vehicle, the propulsion system 155b may include an engine or batteries, a driveshaft, and one or more propellers or turbofans (vertically or horizontally oriented), for example. Of course, other components or combination of components may be used to define the propulsion system 155b.

The second device 132b also includes a second optical transceiver 138b. Similarly to the first optical transceiver 138a, the second optical transceiver 138b may be a second laser transceiver for example, a second vertical cavity surface emitting laser (VCSEL). The second optical transceiver 138b may operate in the blue or blue-green color spectrum. In some embodiments, for example, terrestrial and/or aerial, the second optical transceiver 138b may operate in a range of wavelengths, for example, just outside of the visible spectrum (e.g., 900-2000 nm).

The second optical transceiver 138b transmits the optical beacon signal 152 toward the first optical transceiver 138a. The second optical transceiver 138b also receives the optical guidance data signal 153 from the first optical transceiver 138a.

The second device 132b also includes a second controller 150b that operates the propulsion system 155b to dock the second device to the docking station 135a of the first device 132a. More particularly, the second controller 150b selectively operates the propulsion system 155b based upon the optical guidance data signal 153 so that the second device is guided to or into the docking station 135a.

In some embodiments, the second device 132b may include a long-range navigation device 139b, for example, along the lines of the long-range navigation device described above. The long-range navigation device 139b is coupled to the second controller 150b, which operates the propulsion system 155b based upon the long-range navigation device. In other words, the long-range navigation device 139b operates the propulsion system 155b to move the second device 132b along a navigational route until it becomes in range of communication between the first and second optical transceivers 138a, 138b. Once in range, the second controller 150b operates the propulsion system 155b to dock the second device 132b at the docking station 135a. Of course, the long-range navigation device 139b may work in conjunction with the first and second optical transceivers 138a, 138b to dock the second device 132b at the docking station 135a.

Those skilled in the art will appreciate that the long-range navigation system 139b may include global positioning system (GPS) receivers, RF receivers, accelerometers, and/or devices, for example, and include an inertial navigation system (INS).

As will be appreciated by those skilled in the art, the first and second optical transceivers 138a, 138b are advantageously used for both imaging and communications. That is, the first and second optical transceivers 138a, 138b communicate therebetween optical beacon signals 152 (imaging) and optical guidance data signals 153 (communications).

The docking system 120 that includes the second device 132b in the form of an airborne vehicle, may be advantageous for assisting a drone landing on a platform at sea (ship, buoy, etc.), refueling aircraft with another aircraft (drone applications), unmanned aerial vehicle (UAV)-to-UAV avoidance or wireless tethering for specialized formation flying, for example. The docking system 120 that includes the second device 132b in the form of a terrestrial vehicle, may assist in robot, refueling ships at sea with another vessel (e.g., drone applications), and in automotive industry for self-docking or self-parking vehicles, for example.

When the docking system 120 includes the second device 132b in the form of a space vehicle, the docking system may assist in the docking of spacecraft (vehicle) docking into a space station, spacecraft (vehicle) servicing a satellite, a lander releasing vehicle drones to investigate planetary surface (e.g., Mars rovers) and the drones navigating back to the lander. The docking system 120 that includes a space vehicle may also be advantageous for satellite-to-satellite avoidance or wireless tethering for specialized formation flying, for example.

Those skilled in the art will appreciate that when the docking system 120 includes the second device 132b in the form of an underwater vehicle, the docking system may be particularly advantageous for docking into spaced apart nodes, as described above, docking into a docking station or bay on another vehicle (e.g., UUV onto a submarine, or ROV onto a submarine bay). The second vehicle 132b in the form of an underwater vehicle may also be advantageous in offshore oil and gas operations, for example, for servicing oil and gas infrastructure. The second vehicle 132b in the form of an underwater vehicle may also be advantageous for USV-to-USV or AUV-to-AUV tethering for strategic formation, and/or USV-to-AUV situational awareness navigating in relatively tight areas around structures, for example.

Figure 9:
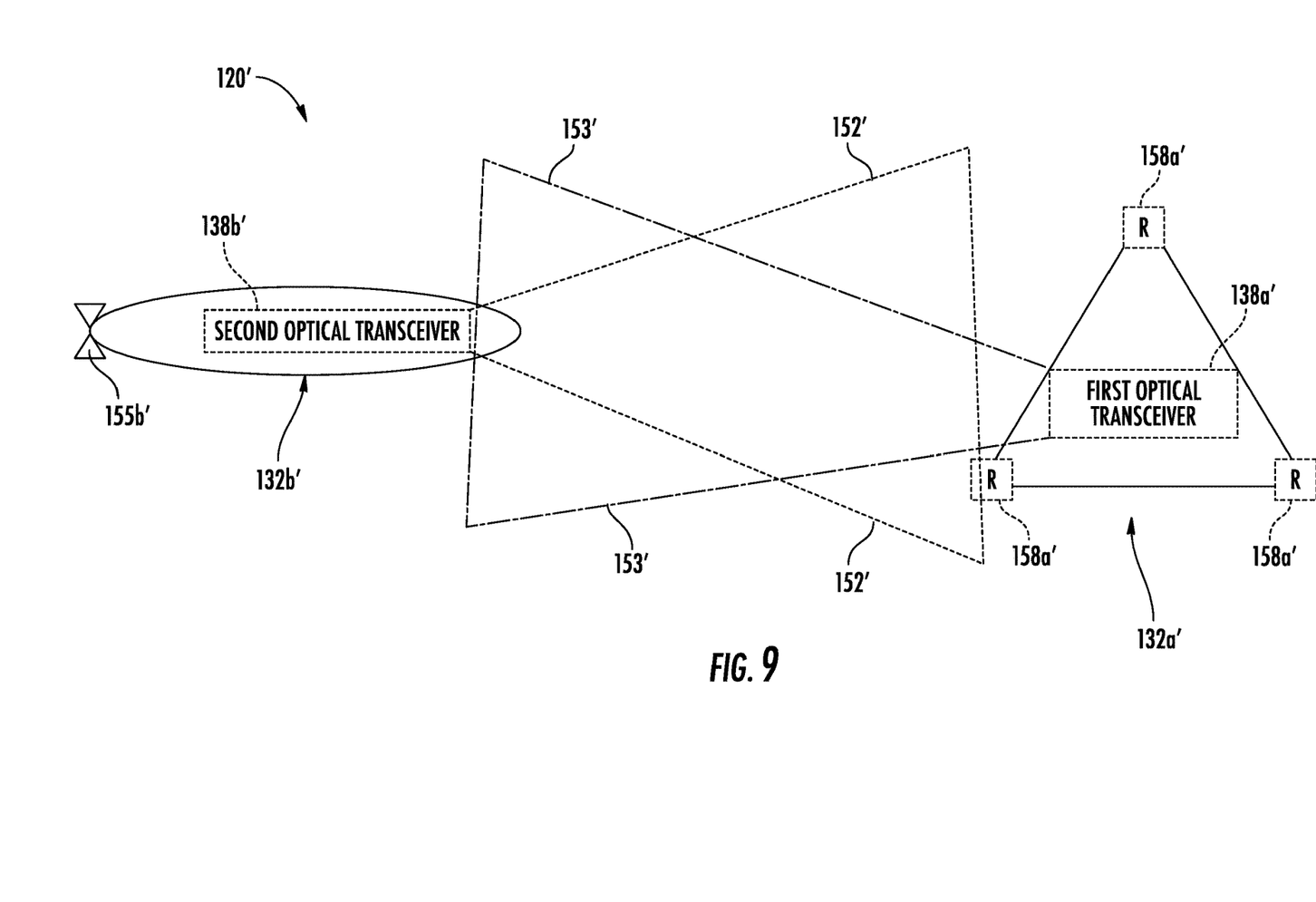
FIG. 9 is a schematic diagram of an exemplary implementation of a docking system in accordance with an embodiment.

Referring now additionally to FIG. 9, further details of the docking system 120' as it relates an undersea application will now be described. The docking system 120' uses the first and second optical transceivers 138a', 138b' as an optical modem pair. It may desirable, however, to includes additional photon collectors adjacent the docking station, for example, three, for homing and docking functionality to remotely guide the second device 132b' in the form of an incoming undersea vehicle into a docking station of the first device 132a'. The docking system 120' does not rely on an imaging lens to determine range and bearing of the incoming vehicle (i.e., second device). Instead the rising edge or phase shift of an expanding optical wavefront generated with a light emitting diode (LED) or photo acoustic tomography (PAT)-capable laser-based optical communications modem (i.e., the second optical transceiver 138b') is detected. Such a self-radiating optical beacon 152' may operate over at least 16 one-way diffuse beam attenuation lengths (up to 300 meters in the clear coastal ocean) versus 2-3 one-way diffuse attenuation lengths with a camera method, and 5-6 one-way attenuation lengths with a LiDAR.

The docking system 120' processing is based upon multilateration, which is also referred to as hyperbolic positioning. This technique uses multiple spatially separated transmitters or receivers to estimate the position of one receiver or transmitter (i.e., GPS). This is done by calculating the time difference of arrival (TDOA) from the time of arrival (TOA) of each transmitter to the receiver or from the transmitter to each receiver and computing the position using the hyperbolic method described by Bucher et al., as will be appreciated by those skilled in the art.

For a 3D positioning system, at least four receivers may be desirable to reduce ambiguities and improve accuracy. The most common methods to measure TOA are direct time of flight (TOF) measurements and extraction of relative TOA from the phase of a continuous sinusoidal signal. To measure TOF directly, a short pulse may be used, and the difference in arrival times is used to determine TOA. When a continuous sinusoidal waveform is used for the transmitter, the relative TOA can be extracted from the detected phase difference of two synchronized signals (i.e. two receivers observing the same signal).

In similar applications, an array detector (i.e., a camera) and structured illumination (i.e., a laser line or grid of laser dots) may be used to estimate both the range and azimuthal/elevation angles to the moving target. However, due to multiple scattering effects that occur over multiple scattering lengths in typical coastal conditions, camera or flash-LiDAR based systems generally do not provide effective performance over the wide range of conditions typically encountered. The use of pulsed or modulated laser source waveforms, combined with a small array of single element detectors with non-imaging optics (i.e. bucket collectors that are used for optical modems)—such as described herein with respect to the docking system 120', may provide useful data through a wider range of conditions and also simplifies the calibration process, measurement setup, and reduces the amount of data to be collected compared to the use of multiple structured lighting cameras or flash-LiDAR imagers and their associated high speed image/video processing algorithms. In some embodiments, the docking system 120' may use orbital angular momentum beams to better discriminate direct (ballistic) light through the many scattering lengths, as will be appreciated by those skilled in the art.

As described above, and with respect to an embodiment where the second device 132b' is in the form of a UUV, the UUV transmits, via the second optical transceiver 138b', the optical beacon signal 152' in a direction of a known docking station on a first device 132a'. Each receiver element of an array thereof of the first optical transceiver 138a' detects the optical beacon signal 152', which is directional. The first transceiver 138a' or first optical modem, as described above, illustratively includes three additional receivers 158a' that are configured or positioned to define a triangle.

The second controller based upon a TDOA, computes the range and bearing (both elevation and azimuthal bearing). The first optical transceiver 138a' transmits to the UUV, or second device 132b', the relative displacement and suggested waypoints.

A method aspect is directed to a method of docking a second device 132b moveable relative to a first device 132a.

The method includes using a first controller 150a of the first device 132a to operate a first optical transceiver 138a of the first device to receive an optical beacon signal 152, and generate and transmit an optical guidance data signal 153 based on the optical beacon signal. The method also includes using a second controller 150b of the second device 132b to cooperate with a second optical transceiver 138b of the second device to transmit the optical beacon signal 152 toward the first optical transceiver 138a and receive the optical guidance data signal 153 from the first optical transceiver, and operate a propulsion system 155b of the second device based upon the optical guidance data signal to dock the second device to a docking station 135a of the first device 132a.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. An underwater communications network comprising:
a plurality of spaced apart nodes on a bottom of a body of water; and
fiber optic cabling connecting said plurality of spaced apart nodes;
each node comprising
a frame,
a node short-range navigation device carried by said frame, and
an unmanned underwater vehicle (UUV) docked at said frame after delivering a fiber optic cable along a navigation path from an adjacent node, said UUV configured to cooperate with said node short-range navigation device during an end portion of the navigation path adjacent said frame.

2. The underwater communications network of claim 1 wherein said node short-range navigation device comprises at least one of a short-range acoustic navigation device, short-range optical navigation device, and a short-range radio-frequency (RF) navigation beacon.

3. The underwater communications network of claim 1 wherein said UUV comprises a UUV short-range navigation device cooperating with said node short-range navigation device.

4. The underwater communications network of claim 1 wherein said UUV comprises a node long-range navigation device for said UUV as said UUV travels along the navigation path.

5. The underwater communications network of claim 1 wherein at least one node of said plurality of spaced apart nodes comprises a deployable electronic buoy carried by said frame.

6. The underwater communications network of claim 5 wherein said deployable electronic buoy comprises a deployable electronic sensor buoy.

7. The underwater communications network of claim 6 wherein said deployable electronic sensor buoy comprises one of a vibration sensor, a temperature sensor, and a pressure sensor.

8. The underwater communications network of claim 5 wherein said deployable electronic buoy comprises a deployable electronic wireless communications buoy.

9. The underwater communications network of claim 1 wherein said fiber optic cabling comprises at least one sensing optical fiber.

10. The underwater communications network of claim 1 wherein each node comprises communications circuitry coupled to the fiber optic cabling.

11. The underwater communications network of claim 1 wherein each node comprises a power source coupled to the communications circuitry.

12. The underwater communications network of claim 1 wherein said frame comprises a docking station for receiving said UUV therein.

13. A node for an underwater communications network including a plurality of spaced apart nodes on a bottom of a body of water, and fiber optic cabling connecting the plurality of spaced apart nodes, the node comprising:
a frame;
a node short-range navigation device carried by said frame; and
an unmanned underwater vehicle (UUV) carried by said frame and loaded to be sent to a target node of the plurality thereof for delivering a fiber optic cable along a navigation path from an adjacent node, said UUV configured to cooperate with said node short-range navigation device during an end portion of the navigation path adjacent said frame.

14. The node of claim 13 wherein said node short-range navigation device comprises at least one of a short-range acoustic navigation device, short-range optical navigation device, and a short-range radio-frequency (RF) navigation beacon.

15. The node of claim 13 wherein said UUV comprises a UUV short-range navigation device cooperating with said node short-range navigation device.

16. The node of claim 13 wherein said UUV comprises a node long-range navigation device for said UUV as said UUV travels along the navigation path.

17. The node of claim 13 further comprising a deployable electronic sensor buoy carried by said frame.

18. The node of claim 13 comprising a deployable electronic communications buoy carried by said frame.

19. A method of forming an underwater communications network comprising:
deploying a plurality of spaced apart nodes on a bottom of a body of water, each node comprising a frame, a node short-range navigation device carried by the frame, and an unmanned underwater vehicle (UUV) carried by the frame; and
connecting the plurality of spaced apart nodes with fiber optic cabling by using the UUVs to deliver a fiber optic cable along a navigation path of travel from a given node to an adjacent node, the UUV cooperating with the node short-range navigation device during an end portion of the navigation path adjacent the frame.

20. The method of claim 19 wherein the node short-range navigation device comprises at least one of a short-range acoustic navigation device, short-range optical navigation device, and a short-range radio-frequency (RF) navigation beacon.

21. The method of claim 19 wherein each UUV comprises a UUV short-range navigation device cooperating with the node short-range navigation device.

22. The method of claim 19 wherein each UUV comprises a node long-range navigation device for the UUV as the UUV travels along the navigation path.

23. The method of claim 19 comprising deploying a deployable electronic buoy from at least one node.

24. The method of claim 23 wherein the deployable electronic buoy comprises a deployable electronic sensor buoy.

25. The method of claim 23 wherein the deployable electronic buoy comprises a deployable communications buoy.

* * * * *